United States Patent
Partila et al.

(10) Patent No.: US 11,677,872 B2
(45) Date of Patent: Jun. 13, 2023

(54) SECURE REMOTE DATA SUBMISSION FOR IVR SYSTEMS

(71) Applicant: Bank of America Corporation, Charlotte, NC (US)

(72) Inventors: Juraj Partila, Belle Mead, NJ (US); Yogesh Raghuvanshi, Princeton, NJ (US); Saurabh Mehta, Irving, TX (US); Dhiraj Jain, Canyon Country, CA (US); ChiaHsun Lin, Plano, TX (US); Lining Mo, San Jose, CA (US); Shali Liu, Plano, TX (US); Sivakumar Nagarajan, Allen, TX (US)

(73) Assignee: Bank of America Corporation, Charlotte, NC (US)

( * ) Notice: Subject to any disclaimer, the term of this patent is extended or adjusted under 35 U.S.C. 154(b) by 165 days.

(21) Appl. No.: 17/400,435

(22) Filed: Aug. 12, 2021

(65) Prior Publication Data

US 2023/0050098 A1    Feb. 16, 2023

(51) Int. Cl.
*H04M 3/493* (2006.01)
*H04L 9/40* (2022.01)

(52) U.S. Cl.
CPC ...... *H04M 3/4936* (2013.01); *H04L 63/0861* (2013.01)

(58) Field of Classification Search
CPC ............ H04M 3/51; H04M 3/4936; H04M 2203/6054; H04M 2203/6009; H04M 2250/22; H04M 3/42076; H04L 63/0861; H04L 63/18; H04L 63/20; G06F 21/31; H04W 12/06
USPC ........................................................ 704/275
See application file for complete search history.

(56) References Cited

U.S. PATENT DOCUMENTS

| | | | |
|---|---|---|---|
| 10,523,708 B1 * | 12/2019 | Ilincic | H04L 63/18 |
| 10,652,739 B1 * | 5/2020 | Lilley | H04W 12/06 |
| 2014/0189808 A1 * | 7/2014 | Mahaffey | G06F 21/31 |
| | | | 726/4 |
| 2022/0038502 A1 * | 2/2022 | Jean | H04L 63/20 |
| 2023/0015583 A1 * | 1/2023 | Merchant | H04M 3/42076 |

* cited by examiner

*Primary Examiner* — Md S Elahee
(74) *Attorney, Agent, or Firm* — Weiss & Arons LLP (57) ABSTRACT

Apparatus and methods for enhancing security of an authentication process of a caller that initiated a call in an Interactive Voice Response ("IVR") system are provided. The methods may include routing the call through the IVR system to a headset. After the routing, the methods may include retrieving data associated with the caller. In response to the retrieved data meeting one or more predetermined conditions, a graphical user interface of an agent computer paired to the headset may display a plurality of validation information for validating the caller. Selection by the agent of validation information may trigger methods for transmitting a request to the caller, via a caller mobile phone, to input the validation information selected by the agent. The methods may additionally include authenticating the caller based at least in part on the information input into the mobile phone.

20 Claims, 9 Drawing Sheets

CALLER NAME: JAMES DOE

☑ On line mobile application downloaded — 409
☑ Most recently accessed Jan 1, 2021 — 411

Choose Your Authentication Method(s)

☐ Social Security Number
☒ Address
☐ Account Number
☒ Date of Birth
☐ Zip

[Submit] — 407

403

Customer Account Information*
Schedule a Payment*
Apply for a Loan*
Add an Authorized User*

413

*NOTE: Access to these links are restricted until customer authenticates via a mobile banking app

SECURE REMOTE DATA SUBMISSION FOR IVR SYSTEMS

FIELD OF TECHNOLOGY

Aspects of the disclosure relate to providing apparatus and methods for remote data submission. In particular, the disclosure relates to apparatus and methods for secure, remote data submission for verifying an identity of a caller that initiated a call in an Interactive Voice Response ("IVR") system.

BACKGROUND

In traditional IVR systems, a caller initiates a call with the IVR system by calling a phone number. The IVR system receives the call and subsequently routs the call through the IVR system based on caller input. Sometimes, the automated options offered by the IVR system are insufficient to meet the caller's needs. When this happens, the IVR system routes the call to an agent headset.

After the routing of the call, an agent typically verifies the caller's identity prior to offering services to the caller. Traditional verification requires the agent to verbally request identifying information from the caller, such as a social security number ("SSN"), home address, date of birth ("DOB"), etc. In response, the caller verbally dictates to the agent the requested information.

These traditional verification techniques are not desirable at least because the caller may be in a public location during the call, and the caller's verbal responses could potentially be overheard by a third party. Furthermore, an agent sometimes has difficulty understanding or accurately transcribing the caller's verbal responses, resulting in frustration on behalf of both the caller and the agent and a delay, for the caller, in meeting their needs.

It is desirable, therefore, to provide apparatus and methods for quickly and securely obtaining identification information from a caller to verify the caller's identity while the caller's call is being processed by an IVR system. This is desirable at least because quick and secure obtention of the information and will both increase caller satisfaction and optimize agent resources.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Apparatus and methods for enhancing security of an authentication process of a caller initiating a call in an Interactive Voice Response ("IVR") system are provided. The methods may include using an IVR application run by the IVR system to identify a telephone number associated with the call and an identity of the caller.

The methods may include using the IVR application to correlate the call with a phone number. The IVR application may also check for spoofing. The IVR application may also determine an identity of the caller. For example, the IVR application may request one or more pieces of non-public information to uniquely verify the caller's identity, such as a partial or full account number, last digits of a SIN, a ZIP code, a one-time token, or any other suitable information.

The IVR system may receive one or more selections or data inputs from the caller using dual-tone multi-frequency (DTMF) tones. A DTMF tone may be a tone generated by the caller when a number the caller's phone keypad is selected. The IVR system may receive one or more selections from the caller by receiving a verbal command from the caller and leveraging voice recognition systems to recognize the verbal command.

The IVR system may support the call. The IVR application may use pre-recorded messages to attempt to provide the caller with a desired service. When the IVR application identifies a need for the caller to speak to a caller service representative, either based on a caller selection or by satisfying one or more predefined conditions, the IVR application may route the call to a headset. The headset may be in electronic communication with a personal computing system. For the purposes of the application, the personal computing system is referred to herein as an agent computer, however any suitable computing system, such as a laptop, mobile phone, tablet, etc.

In response to the IVR application routing the call to the headset, the agent computer may initiate a search of a database to determine if the call satisfies one or more predetermined conditions. The search may include searching two or more databases.

In response to the routing, the agent computer may identify a mobile phone owned by the caller. The mobile phone may initiate the call. The mobile phone may be a mobile phone different from the phone initiating the call. The mobile phone may be associated with an identity of the caller in the database(s).

In some embodiments, the methods described herein may be performed after the routing. In some of these embodiments, an agent selection may trigger the authentication process described herein. The agent selection may be executed in a graphical user interface ("GUI") of the agent computer in response to a caller requesting a service requiring an authentication different from an authentication previously performed.

In exemplary embodiments, the agent computer may search the database to determine if the mobile phone associated with the caller has downloaded an application on the mobile phone. The application is referred to herein as a "secure application," however it is to be understood that the application may be any suitable application. If the caller is determined to have downloaded the secure application, the agent computer may proceed to determine if the secure application was accessed on the mobile phone during a pre-determined time period. The time period may be 30, 60 or 90 days preceding a current date, or any other suitable time period.

For example, the database may archive all interactions between the caller and the secure application downloaded on the caller's mobile phone. The database may include one or more data tables storing date and time and, in some embodiments, a channel of each caller interaction.

In some embodiments, the agent computer may generate a call using an application programming interface ("API") running on the agent computer to determine if the secure application is downloaded on the mobile phone and if the secure application has been accessed during the predetermined time period. The API may be run on a server. The server may be a middle-tier server, a web server, an application server, a server farm located across geographical locations for redundancy and resiliency, or any other suitable server. The agent computer may access the API using an internet connection. The API may generate at least a portion of the agent desktop GUI described herein.

In the event that either the mobile phone has not downloaded the secure application, and/or the secure application has not been accessed during the predetermined time period, an agent operating the headset may request the caller for verbal verification of the caller's identity.

In response to a determination that the secure application is downloaded on the mobile phone and has been accessed during the time period, a machine-learning algorithm may be fed with selections received by the IVR system during the call and prior to the routing. The feeding may be performed by the agent computer. For the purposes of the application, functions described as being performed by the agent computer may be performed locally on the agent computer or performed by the API running on the agent computer. The machine learning algorithm may be trained with training data including sets of caller selections, in an IVR system, and, for each set, one or more pieces of validation information used to validate the call.

The methods may include the agent computer receiving, from the machine-learning algorithm, first validation and second validation information. The agent computer may receive a plurality of validation information, the plurality of validation information including the first validation information and the second validation information. Exemplary validation information may include an account number, a complete TIN/SSN, last four digits of a TIN/SSN, a phone number, an ID number, an address, a ZIP code, a one-time token, a DOB, initials or full name, an answer to security question, a PIN, a mother's maiden name, or any other suitable data.

In some embodiments, the first validation information may be associated with a first tag and the second validation information may be associated with a second tag. Each of the first and second tag may include instructions, from the machine-learning algorithm, for how to display the validation information on GUI of the agent computer.

The methods may include displaying on the GUI the first validation information and the second validation information. In embodiments when the validation information is associated with tags, the first tag may include a selected format instruction and the second tag may include a selectable format. In these embodiments, the displaying, on the GUI, may include displaying the first validation information in a selected format and displaying the second validation information in a selectable format. The format for displaying each piece of identification information may be triggered by the tag associated with the piece of identification information.

The machine learning algorithm may use the selections received from the caller through the IVR system to associate the first tag with the first piece of validation information. Association of a 'selected format' tag with a piece of validation information may be triggered when the machine learning algorithm has learnt that, for the call at issue which has one or more characteristics, this piece of validation is required to validate the caller. For example, for calls where the caller input incorrect identity information into the IVR system more than 3 times, a SSN may be determined to be required to authenticate the caller by the machine-learning algorithm. Association of a 'selectable format' tag with a piece of validation information may be triggered when the machine learning algorithm has learnt that, for the call at issue which has one or more characteristics, this piece of validation information is optional, but not required, to validate the caller.

The machine learning algorithm may or may not associate a tag with the output validation information. In some embodiments, the validation information output by the machine learning algorithm may all be displayed in a selectable format on the GUI.

In some embodiments, the routing of the call to the agent headset may trigger the agent computer to display a pre-stored list of validation information. The validation information may include the first validation information and the second validation information. Each of the displayed pieces of validation information may be displayed in a selectable format. In exemplary embodiments, the methods may include displaying, on the GUI, the first validation information and the second validation information in response to a determination that the secure application is downloaded on the mobile phone and has been accessed during the predetermined time period.

The methods may include displaying, on the GUI, a plurality of validation information. The plurality of validation information may include the first validation and the second validation information. Each of the plurality of validation information displayed may be selectable. In some embodiments, one or more of the plurality of validation information may be displayed in a selected format. In some of these embodiments, selections received by the IVR system from the call may be transmitted to the machine learning algorithm, which subsequently identifies the pieces of validation information for displaying in the selected format, as described above.

The methods may include receiving, in the GUI, a selection of the second validation information and a command to trigger a transmission of a push notification to the mobile phone. The methods may include the agent computer generating the push notification to transmit to the mobile phone. In some embodiments, the API running on the agent computer may generate the push notification. A server running the API may transmit the push notification to the mobile phone. In some embodiments, the push notification may detail validation information and consents to be provided by caller. The push notification may instruct the secure application to generate a pop-up notification. The pop-up notification may initiate an authentication process.

The push notification may instruct the secure application running on the mobile phone to initiate an authentication process. The authentication process may be an authentication process run, by the secure application, prior to authorizing access to the secure application. For example, the authentication process may include the caller placing their finger on a fingerprint scanner, taking a scan of their eye, capturing an image of the caller's face using a camera embedded in the mobile phone, inputting one or more passwords, PINs, security tokens, etc.

The methods may include the mobile phone receiving the push notification. In response to receipt of the push notification, the mobile phone may query the server to retrieve request details and necessary dynamic display text to display to the caller.

The API run on the agent computer may be a first API. The mobile phone may run a second API. The second API may execute functions of the mobile phone described herein, such as functions associated with the secure application. The server may support both the first API and the second API. The server may transmit information between the first API and the second API.

Functions and method steps described herein as being performed by the mobile phone may be performed by the secure application running on the mobile phone. The secure application may include the second API.

The methods may include initiating, at the mobile phone, the authentication process in response to receipt of the push notification and not in response to a user input received in the mobile phone. The authentication process may include establishing a secure session with the server. Exemplary security features for ensuring secure data transmission between the second API and the server may include an implementation of HTTPS/TLS (transport layer security) protocol. After completion of the authentication process, the methods may include displaying, on the mobile phone, a data entry validation interface. The authentication process may be initiated by the secure application.

In embodiments where the IVR selections are not fed to the machine learning algorithm, and the first validation information was selected in the GUI, the data entry validation interface may include a first data input field for receiving the first validation information.

In embodiments where the IVR selections are fed to the machine learning algorithm, the first validation information was displayed in a selected format, and a selection of the second validation was received in the GUI, the data entry validation interface may include a first data input field for receiving the first validation information and a second data input field for receiving the second validation information. It is to be understood that, in the methods, for any piece of information displayed in a selected form on the GUI, a data input field is included in the data entry validation interface for each piece of information.

The methods may include validating, at the server, the input data. The validating may include comparing data input into the one or more displayed input fields to data stored in a systems-of-records database. Exemplary validation performed by the server may include using a validation engine storing dynamic, updatable business rules to process and determine the validity of the input data. The server may transmit the input data to the validation engine in a complete or partially masked form. The data transmitted from the server to the validation engine may be compared against a system of record ("SOR") database. The validation engine may return to the server either a full match or, for a partial match, a success percentage. The validation engine may store dynamic threshold values for determining parameters for a sufficient or insufficient match.

Exemplary secure interfaces between the validation server and the SOR may include TLS protected REST/SOAP service API, secure JDBC/ODBC connection, a secure message queue, or any other suitable secure interface.

The validation engine may return to the server an output indicating if the input data has been validated. When the data is validated by the validation engine, the methods may include triggering a display, on the GUI, of the validated input data in a partially concealed form or in a complete form.

Validation of the information may alter characteristics of information displayed in the GUI. In exemplary embodiments, the GUI may include a plurality of selectable options. Each selectable option, when selected, may provide access to an electronic service. In some embodiments, prior to the validation, the selectable options displayed in the GUI may be disabled. Disabled may refer to a selectable option that, when disabled, does not provide access to a webpage or service linked to the selectable option despite being selected by a user.

In some embodiments, after the validating, the selectable options may be toggled to a selectable format.

In some embodiments, after the validating, only selectable options associated with the validation data in a database may be toggled to a selectable format. For example, if a caller validated their identity using their SSN and their DOB, all selectable options may be toggled to a selectable format. In contrast, in exemplary embodiments, if the caller validated their identity using only their name and phone number, only a subset of the selectable options may be toggled to the selectable format. In this example, the database may associate all the selectable options with the SSN/DOB combination and only associate the subset of selectable options with the name/phone number combination. The more secure information received as validation information, the more services will become available on the GUI, and thus available to the caller.

The methods may include displaying, on the GUI, third validation information. The second validation information may be associated with a first subset of the selectable options. The third validation information may be associated with a second subset of the selectable options, the second subset not including options in the first subset. The validating of the second validation information may toggle the first subset of the selectable options to a selectable format. The validation of the second validation information may toggle the first subset of the selectable options to a selectable format and the second subset of the selectable options remain disabled.

In some embodiments, in response to failing to validate the input data at the server, a subset of selectable options and/or applications running on the agent computer may be restricted and/or maintained in the disabled format. An application may be restricted by disabling any links, tabs and/or input fields associated with the application.

In parallel with the initiating of the authentication process, the methods may include tracking, on the mobile phone, time lapsed after receipt of the push notification. The tracking may be performed by the secure application. In response to the tracked time amounting to a time greater than a threshold time, the methods may include pushing a data request from the mobile phone to the server for the data entry validation interface. These methods may be used to reduce latency and to ensure that, if the data entry validation interface does not timely reach the mobile application due to infrastructure failure or delay, an overload on network condition, carrier load and/or network capacity, then the mobile phone autonomously reaches out to pull the required data. In exemplary embodiments, at the time of the authentication, the secure application may query the server for a pending agent notification, such as the data entry validation interface, if a notification has not yet been received.

After the validation, the methods may include generating, on the call, using the IVR application, an automated message reporting the validation. The automated call may include a pre-recorded, or automatically generated, verbal message such as "validation completed," "congratulations on your successful validation" or any other suitable verbal message. In the event that the information was not validated, the message may report the unsuccessful validation.

In some embodiments, failure to verify the data input into the data input fields may initiate a second display of the data entry validation interface, providing the caller with a second opportunity to validate the caller's identity.

If a caller has entered data one, two, three or more times that was determined to be inaccurate by the server, the server may instruct the agent computer to automatically terminate the call and/or restrict access to a set of services displayed on the agent computer. The restriction of access of services may include hiding tabs, links or shortcuts and/or maintaining selectable options in a disabled format.

The systems and methods of the invention may include apparatus for enhancing security of an authentication process of a caller initiating a call in an Interactive Voice Response ("IVR") system. The apparatus may include the IVR system, the IVR application, the agent computer, the mobile phone, and/or the server. Each of the IVR system, the IVR application, the agent computer, the mobile phone and the server may be configured to perform one or more of the functions described herein. One or more functions described as being performed by the IVR system may additionally or alternately be performed by the IVR application.

The IVR system may be run by the IVR application. The IVR system may be configured to receive a call in the IVR system. The IVR system may identify, based on tonal input received from the call, one or more selections selected by the caller.

The IVR system may identify a telephone number associated with the call and an identity of the caller. The IVR system may route the call to a headset based on predefined rules.

The apparatus may include the agent computer. The agent computer may be in electronic communication with the headset. The agent computer may be configured to identify a routing of the call to the headset. The routing may trigger the agent computer to search a client database to determine if a mobile phone associated with the caller has downloaded a secure application. The routing may additionally or alternately trigger the agent computer to determine if the secure application was accessed on the mobile phone during a pre-determined time period.

In some embodiments, the agent computer may feed the machine-learning algorithm with selections received by the IVR system from the call. The feeding may be initiated in response to a determination that the secure application is downloaded on the mobile phone and has been accessed during the pre-determined time period.

The agent computer may receive, from the machine-learning algorithm, the first validation and second validation information. The first validation information may be associated with a first tag and the second validation information may be associated with a second tag.

In some embodiments, the IVR application may feed the selections received by the IVR system to the machine-learning algorithm prior to, or in parallel with, the routing the call to the headset. In some of these embodiments, the IVR application may transmit the validation information output by the machine-learning algorithm to the agent computer concurrently with the routing of the call to the headset.

The agent computer may be configured to display, on the GUI of the agent computer, the first validation information and the second validation information. In embodiments where the first and second validation is tagged, the first validation information may be displayed in a selected format, as triggered by the first tag, and the second validation information may be displayed in a selectable format, as triggered by the second tag;

The agent computer may receive, in the GUI, a selection of the second validation information and a command to trigger a transmission of a push notification to the mobile phone.

The agent computer, and/or an API run on the agent computer, may transmit the push notification to the mobile phone. The push notification may instruct the mobile phone to initiate the authentication process. The authentication process may be a process run, by the secure application, prior to authorizing access to the secure application.

The GUI may display the plurality of selectable options. Each selectable option, when selected, may provide access to an electronic service. In some embodiments, as described herein, prior to a validation of the first and/or second validation information, the selectable options may be disabled in the GUI. As such, selection of the selectable options, when in the disabled format, may not result in access to an associated electronic service.

The apparatus may include the mobile phone. The mobile phone may be configured to initiate the authentication routine in response to receipt of the push notification. The initiation, at the time of the receipt of the push notification, may be triggered by the receipt of the push notification and absent a user input received in the mobile phone to trigger the authentication routine. The mobile phone may also be configured authenticate the caller based at least in part on the authentication process.

After completion of the authentication process, the mobile phone may display a data entry validation interface. The data entry validation interface may include an input field for each piece of validation information selected in the GUI. The data entry validation interface may include an input field for each piece of validation information displayed in the GUI in a selected format. In exemplary embodiments, the data entry validation interface may include a first data input field for receiving the first validation information and a second data input field for receiving the second validation information.

The mobile phone may be further configured to transmit to the server data input into the data entry field. In embodiments where the secure application comprises an API supported by the server, the server may receive the instruction from the API.

The apparatus may include the server. The server may transmit the push notification from the agent computer to the mobile phone. The server may receive, from the mobile phone, the data input into the data entry field. The server may validate the data input into the data entry validation interface. The validating may be performed as described herein. The server may transmit a notification to the agent computer notifying the agent computer of a successful validation or an unsuccessful validation of the data input into the data entry validation interface.

The agent computer, in response to receipt, from the server, of a notification indicating unsuccessful validation, may be configured to maintain the selectable options in a disabled state. The agent computer, in response to receipt, from the server, of a notification indicating successful validation, may be configured to toggle the selectable options from the disabled state to a selectable state.

In some embodiments, in response to the receipt of the notification indicating successful validation, the agent computer may be configured to display, on the GUI, the data input into the first data input field and data input into the second data input field. In some embodiments, the input data may be displayed in the partially concealed form.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
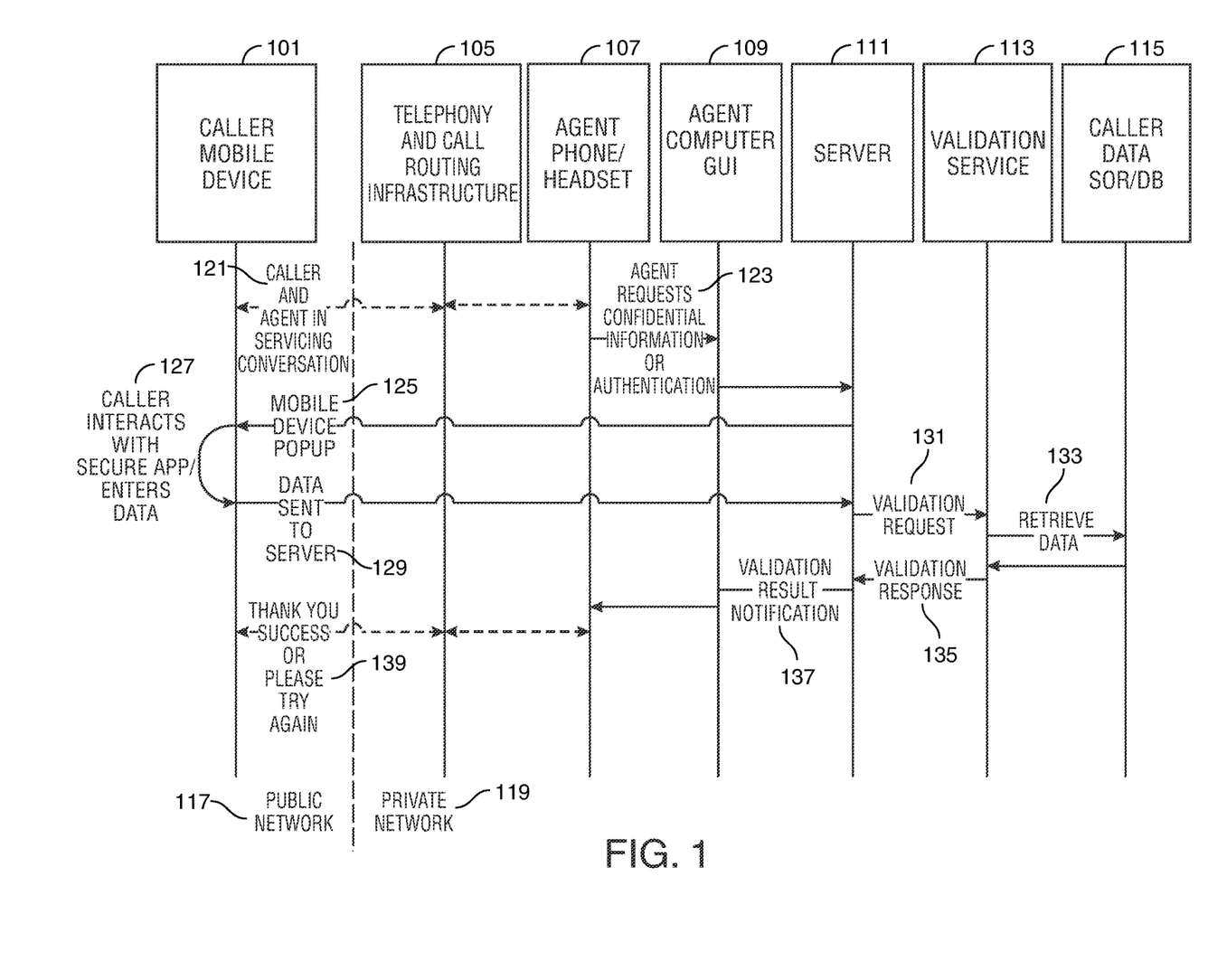
FIG. 1 shows illustrative apparatus and methods in accordance with the invention.

FIG. 1 shows illustrative apparatus and methods in accordance with the invention. The methods illustrated in FIG. 2 may be performed using one or more of apparatus caller mobile device 101, telephony and call routing infrastructure 105, agent phone/headset 107, agent computer GUI 109, server 111, validation service 113 and/or caller data system of record ("SOR") database ("DB") 115. In some embodiments, the methods illustrated in FIG. 1 may be performed using apparatus different from the apparatus illustrated in FIG. 1.

Caller mobile device 101 may connect to public network 117. The remaining apparatus may connect to a private network 119, such as AT&T, Version, etc. The private network 119 may be a private communications network, and may include one or more secure internet connections, call supporting and routing technology, and any other suitable secure electronic communication protocols.

Methods in accordance with the invention may include one or more of steps 121-139. Methods may include steps in an order different from the order disclosed in FIG. 1.

At step 121, a caller and an agent may engage in a servicing conversation. The conversation may be initiated when a call initiated by the caller in an IVR system is transferred to a headset of the agent. At step 123, an agent may request confidential information or authentication. At step 125, a push notification may be pushed from the server to the caller mobile device. At step 127, a caller may interact with the secure application. The interaction may include inputting validation information into a data entry validation interface displayed on the mobile phone via the secure application.

At step 129, the validation information input into the secure application may be transmitted from the caller mobile device to the server. At step 131, the server may transmit a validation request to the validation service. At step 133, the validation service may retrieve data from the client data SOR database. At step 135 the validation service may transmit a validation response to the server. At step 137, a validation result notification may be transmitted to the agent desktop. At step 139, a thank you, success or a please try again notification may be displayed on the caller mobile device.

The IVR system, the agent computer, the server and the mobile phone may include one or more computer systems, platforms, and servers. The computer systems, platforms, and servers may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory. The source database may be part of a computer system. The target database may be part of a computer system.

Computer systems and servers may include RAM, ROM, an input/output ("I/O") module and a non-transitory or non-volatile memory. Machine-readable memory may be configured to store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the computer systems and servers may be stored within the non-transitory memory and/or other storage medium. Software applications may provide instructions to the processor that enable the computing system to perform various functions. The instructions may include any of machine learning and authentication processes described herein. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

A computer system and server may be part of two or more networks. A computing system may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, a computer system and server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards. In some embodiments, the components may be integrated into a single chip. The chip may be silicon-based.

Figure 2:
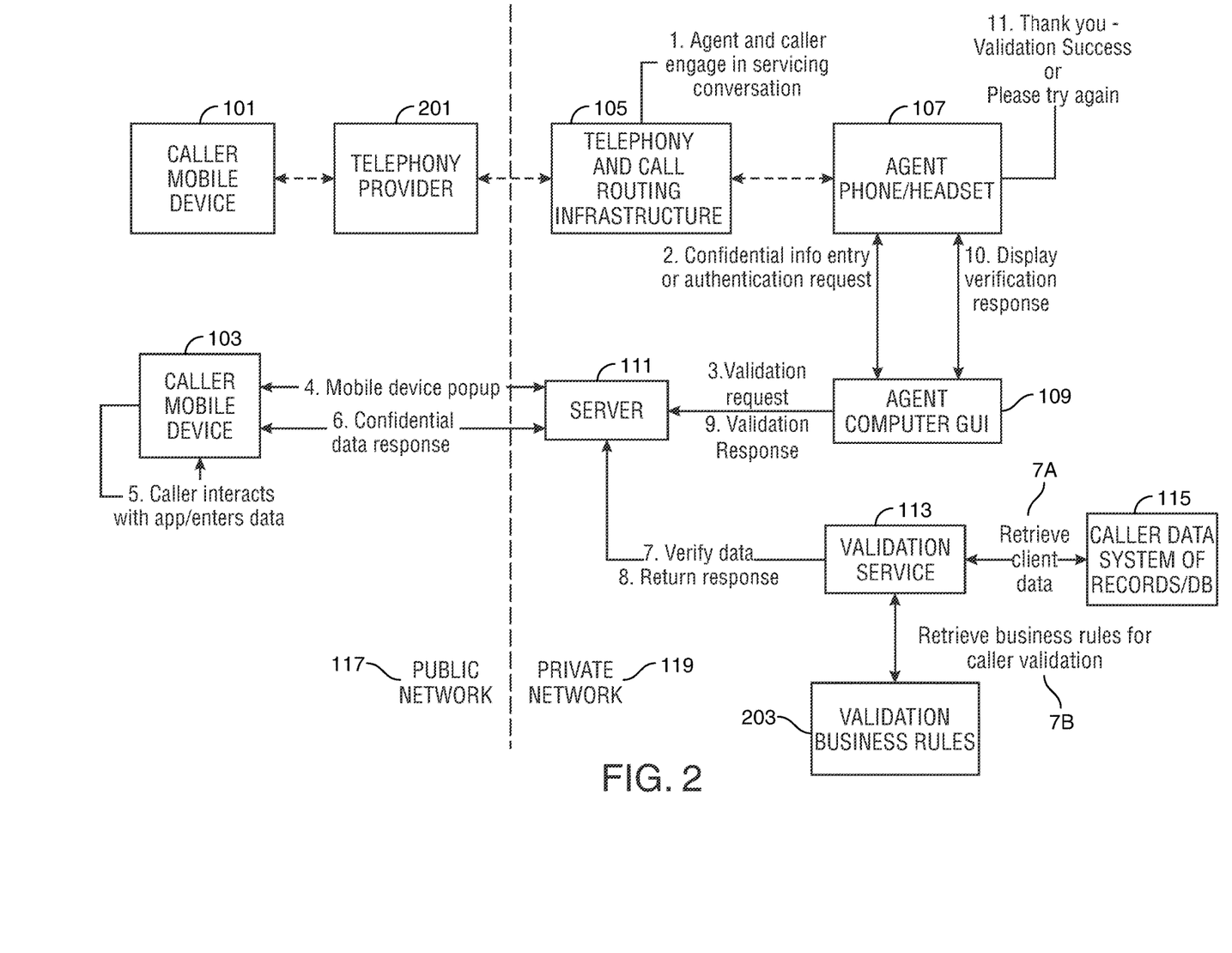
FIG. 2 shows illustrative apparatus and methods in accordance with the invention.

FIG. 2 shows illustrative apparatus and methods in accordance with the invention. The methods illustrated in FIG. 2 may be performed using one or more of caller mobile device 101, caller mobile device 103, telephony and call routing infrastructure 105, agent phone/headset 107, agent computer GUI 109, server 111, validation service 113 and caller data system of record ("SOR") database ("DB") 115, telephony provider 201 and/or validation business rules 203. In some embodiments, the methods illustrated in FIG. 2 may be performed using apparatus different from the apparatus illustrated in FIG. 2.

Exemplary telephony providers 201 may include AT&T and Verizon.

Caller mobile device 101, telephony provider, 201 and customer mobile device 103 may connect to public network 117, such as Verizon or AT&T. The remaining apparatus may connect to a private network 119. The private network 119 may be a private communications network, and may include one or more secure internet connections, call supporting and routing technology, and any other suitable secure electronic communication protocols.

Methods in accordance with the invention may include one or more of steps 1-11. Methods may include steps in an order different from the order disclosed in FIG. 2.

At step 1, a caller and an agent may engage in a servicing conversation. At step 2, the agent may request confidential information or authentication. At step 3, a validation request may be transmitted to the server. At step 4, a push notification may be pushed from the server to the caller mobile device. At step 5, the caller may input data into the secure application. At step 6, data may be transmitted from the caller mobile device to the server. At step 7, the server may transmit a validation request to the validation service. At step 7A, the validation service may retrieve data from the client data SOR database. At step 7B, the validation service may pull validation business rules 203. At step 8, the validation service may transmit a validation response to the server. At step 9, a validation response may be transmitted to the agent desktop. At step 10, a display verification response may be initiated at the agent desktop. At step 11, a thank you, success or a please try again notification may be displayed on the agent desktop.

Figure 3:
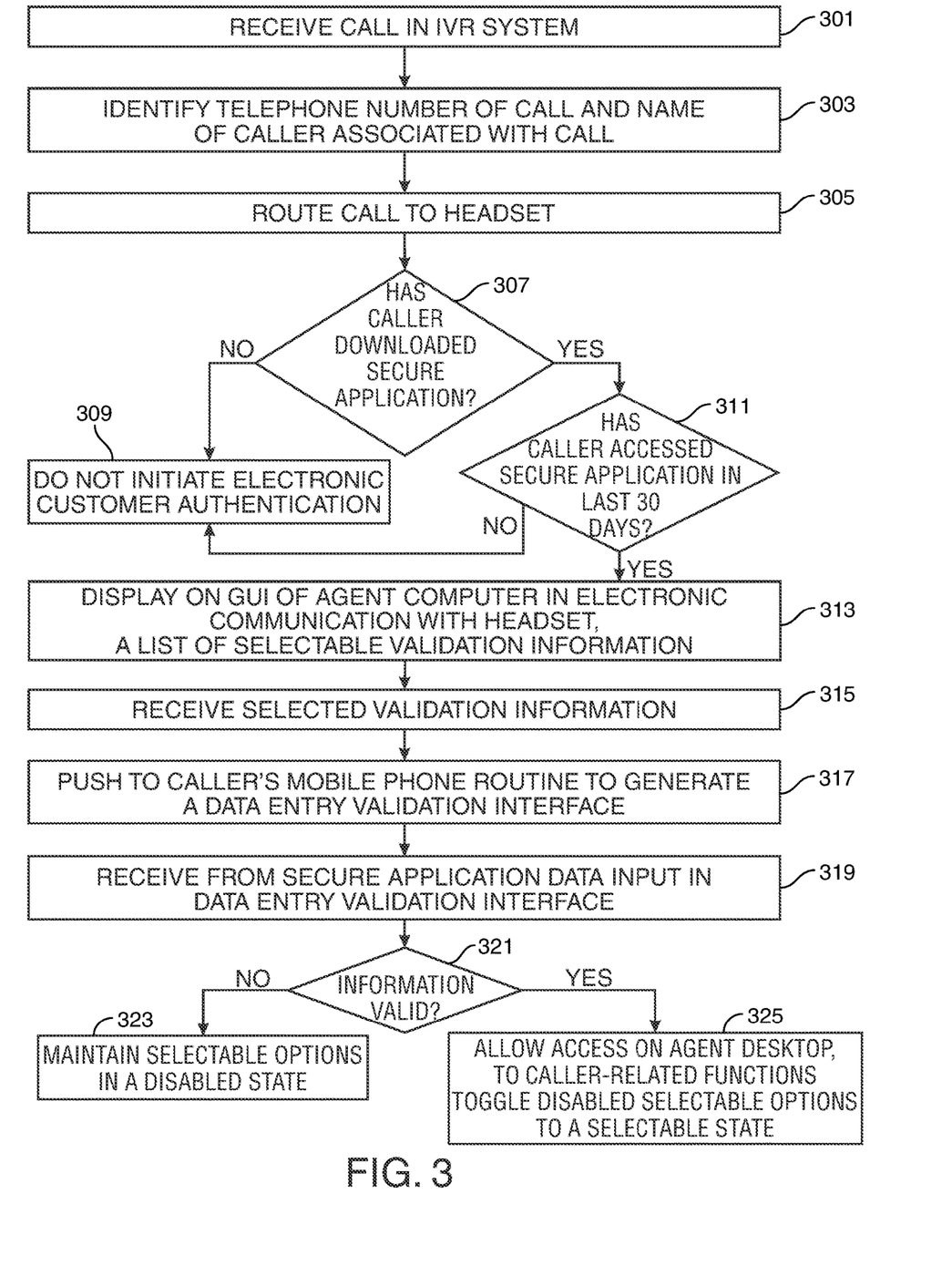
FIG. 3 shows illustrative methods in accordance with the invention.

FIG. 3 shows an exemplary method in accordance with the invention. At step 301, the method may include receiving a call in the IVR system. At step 303, the method may include identifying a telephone number of the call and a name of a caller associated with the call. At step 305, the call may be routed to a headset.

At step 307, it may be determined if the caller has downloaded a secure application. The secure application may be a mobile banking application or any other suitable application. If it is determined that the caller did not download the secure application, the method may include, at step 309, not initiating an electronic authentication process as described herein. If it is determined that the caller has downloaded the secure application, the method may proceed at step 311.

At step 311, the method may include determining if the caller has accessed the secure application within a predetermined time frame, such as the last 30 days. If it is determined that the caller did not access the secure application within the predetermined time frame, the method may include, at step 309, not initiating an electronic authentication process as described herein. If it is determined that the caller did access the secure application within the predetermined time frame, the method may include, at step 313, displaying on a GUI of an agent computer a list of selectable validation information. The agent computer may be in electronic communication with the headset.

At step 315, the GUI may receive a selection of one or more pieces of validation information. At step 317, the method may include pushing to the caller's mobile phone a routine to generate a data entry validation interface. The routine may be included in a push notification. At step 319, the method may include receiving from the secure application data input in the data entry validation interface.

At step 312, the method may include determining if information input into the caller's mobile phone is valid. If the information is determined not to be valid, the method may include, at step 323, restricting access, on the GUI, to one or more selectable options. The restricting the access may include disabling one or more selectable options so that the options, when selected, do not initiate a display of new information on the GUI.

When the agent computer displays the selectable options in a disabled state when the call is routed to the headset, step 323 may include maintaining the selectable options in the disabled state. If the information is determined to be valid, the method may include, at step 325, allowing access, on the GUI, to the one or more functions. The allowing access may include displaying one or more functions or selectable options on the GUI. When the agent computer displays the selectable options in a disabled state when the call is routed to the headset, step 325 may include toggling the selectable, disabled options to a selectable state.

Figure 4:
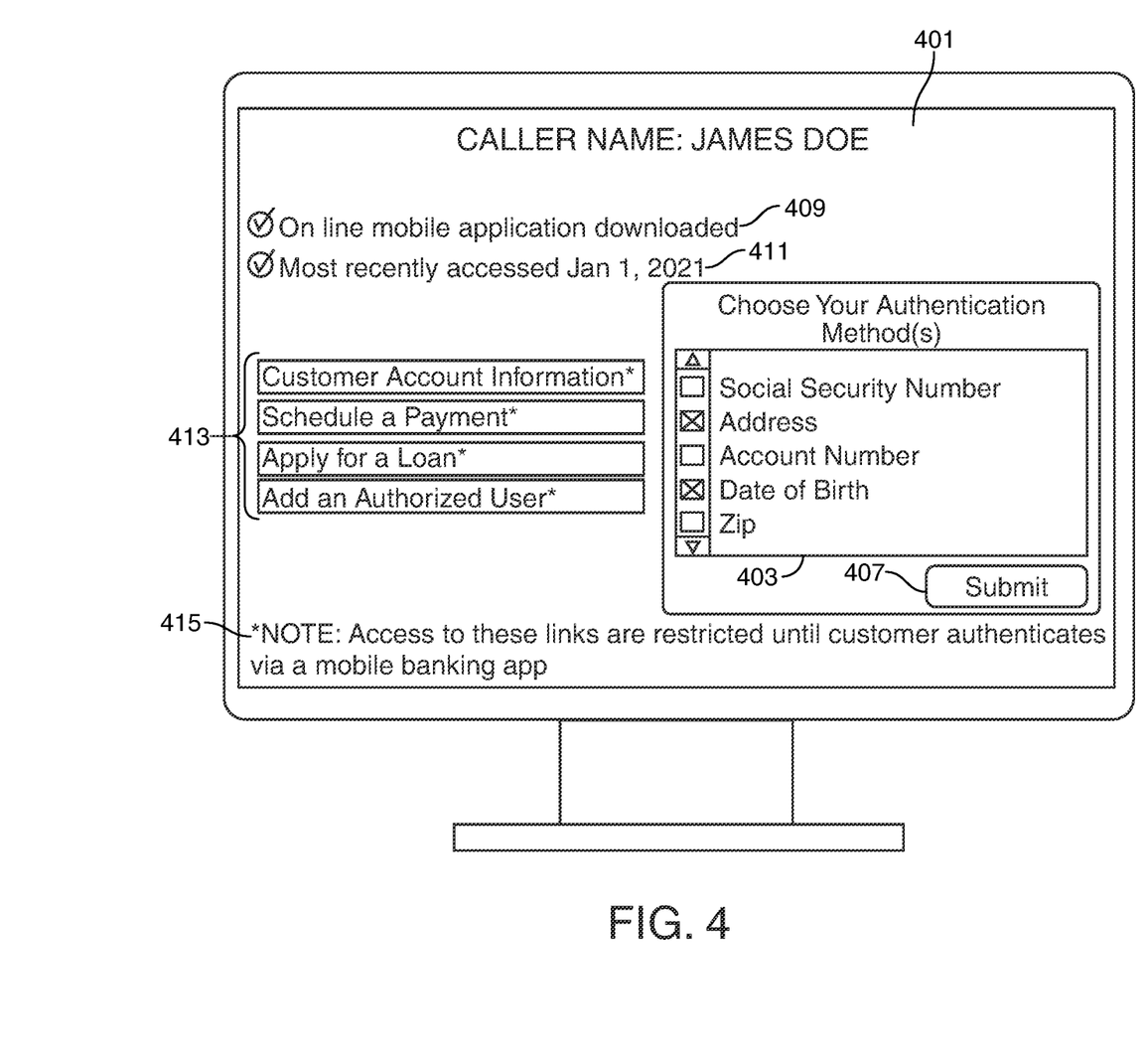
FIG. 4 shows an illustrative agent computer graphical user interface in accordance with the invention.

FIG. 4 shows illustrative GUI 401 displayed on an agent computer in accordance with the invention. GUI 401 may be the GUI. In FIG. 1, a name of a caller, as identified by the IVR application, is displayed. Additionally, indicator 409 is displayed indicating that the caller has downloaded a secure application on their mobile phone. Indicator 411 is also displayed, listing the most recent calendar date on which the caller accessed the secure application.

GUI 401 is shown as including selectable options 413, and a list of validation information 403. A 'submit' button 407 is also displayed which, when selected, generates the push notification to the mobile phone to initiate the authentication process via the secure application. The authentication process may be initiated by the secure application generating a pop-up notification on the mobile phone. In FIG. 4, asterisk 415 tells a user that selectable options 413 have been disabled.

Figure 5:
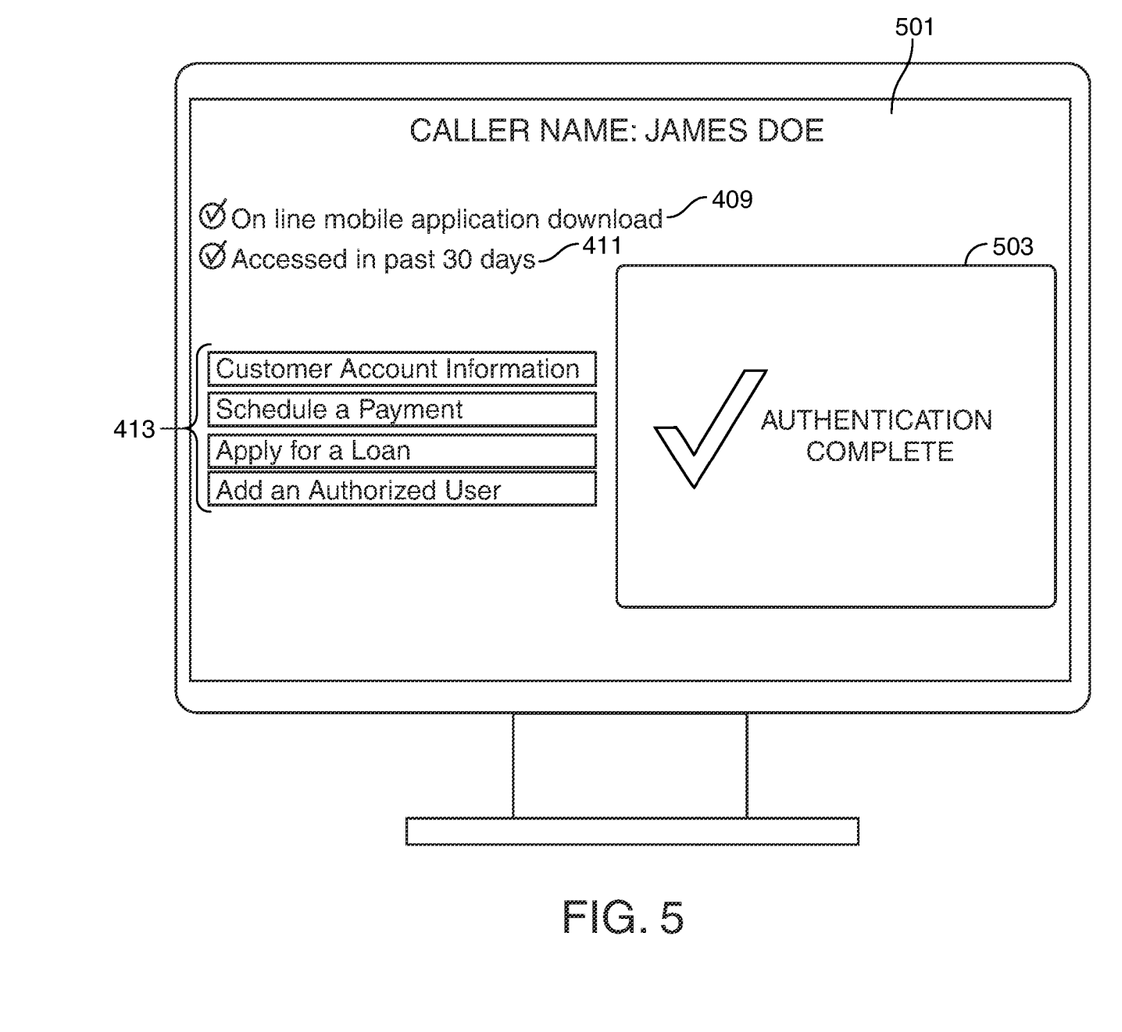
FIG. 5 shows an illustrative agent computer graphical user interface in accordance with the invention.

FIG. 5 shows GUI 501 displayed on the agent computer after caller James Doe has input verification information into their mobile phone, and the information has been verified as described herein. In FIG. 5, text box 503 indicates that the information has been verified. The information input by James Doe into their mobile phone is not displayed in GUI 401. Additionally, in FIG. 5, the asterisk displayed adjacent selectable options 413 has been removed, illustrating that selectable options 413 have now been enabled in response to the verification. Selectable options 413 may be enabled by the agent computer toggling the selectable options from a disabled format to a selectable format.

Figure 6:
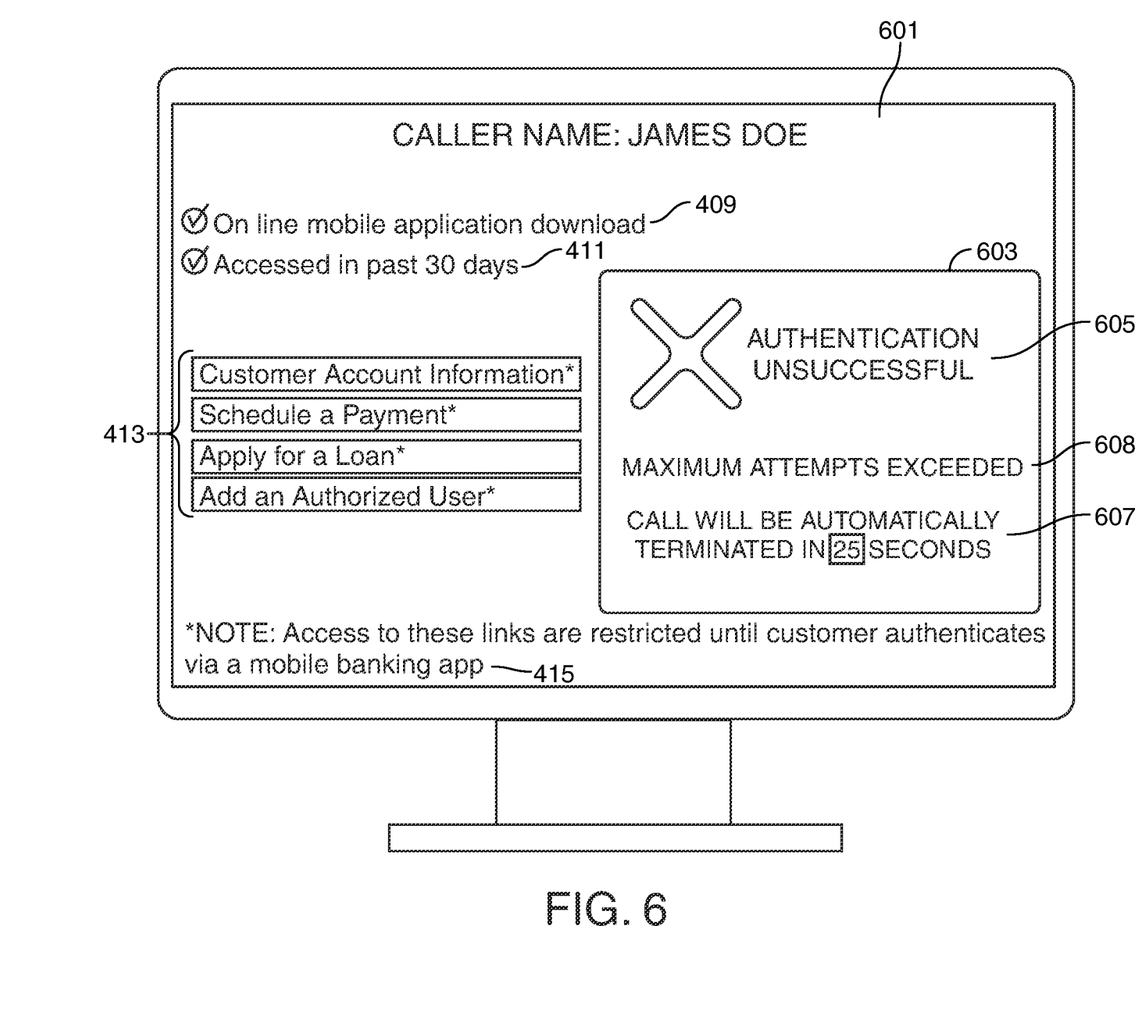
FIG. 6 shows an illustrative agent computer graphical user interface in accordance with the invention.

FIG. 6 shows illustrative GUI 601 when information input by James Doe into their mobile phone was not verified by the server as described herein. In FIG. 6, the selectable options are still in their disabled state. In FIG. 6, text box 603 includes "authentication unsuccessful" text 605, "maximum attempts exceeded" text 608 and "call will be automatically terminated in 25 seconds" 607, indicating that the call is to be shortly terminated due to the failure of the caller to validate their identity. In some embodiments, text 607 may be displayed only after a predetermined number of failed attempts for James Doe to authenticate themselves using the systems and methods described herein.

Figure 7:
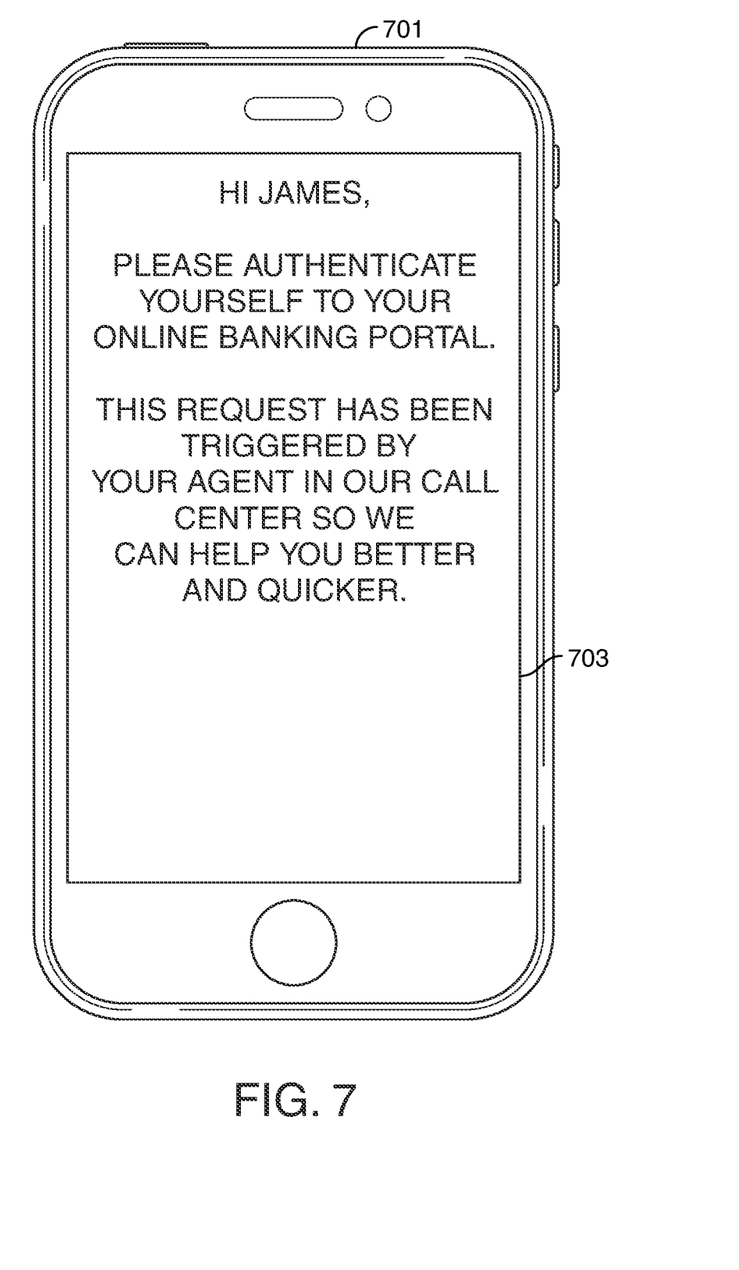
FIG. 7 shows an illustrative graphical user interface on an illustrative mobile device in accordance with the invention.

FIG. 7 shows illustrative mobile phone 701. Illustrative mobile phone 701 may be the mobile phone. Mobile phone 701 is shown displaying display 703. Display 703 may represent an illustrative GUI for starting the mobile phone authentication process described herein.

Figure 8:
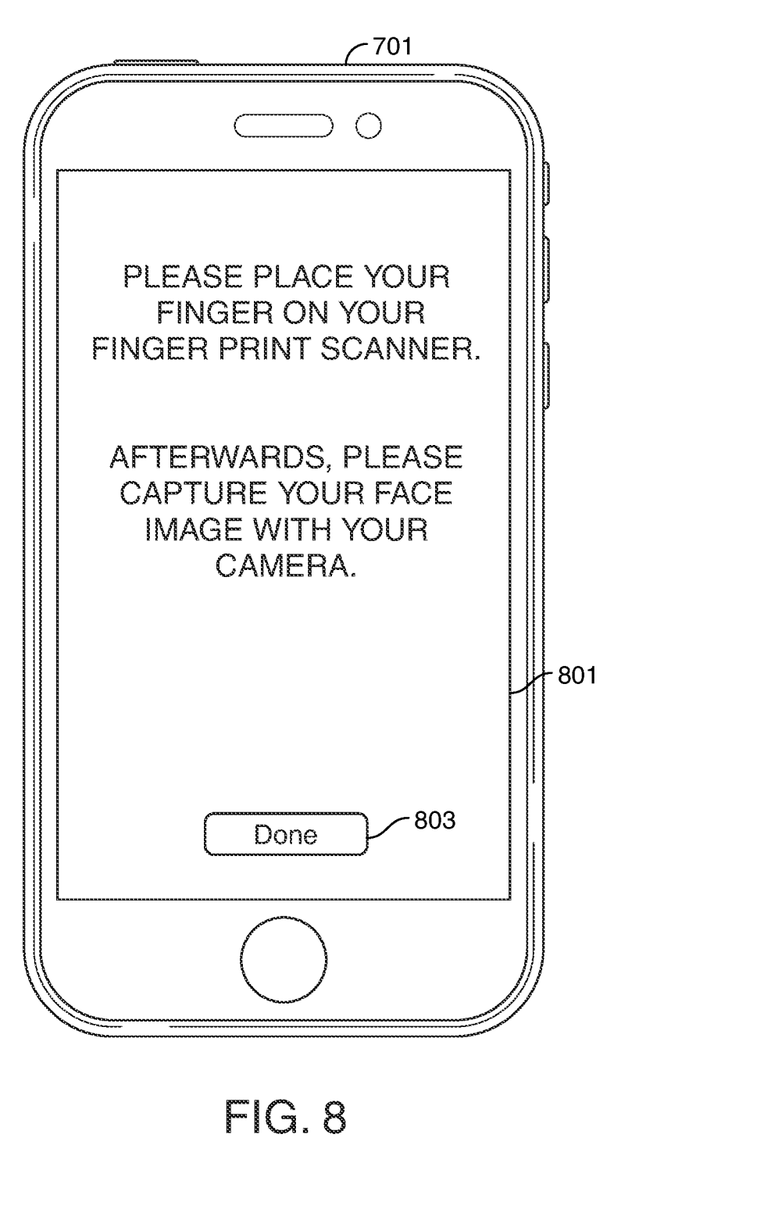
FIG. 8 shows an illustrative graphical user interface on an illustrative mobile device in accordance with the invention.

FIG. 8 shows mobile phone 701 displaying display 801. Display 801 may be a second GUI displayed during the authentication process. The second GUI may include instructions for the caller to follow to authenticate their identity and subsequently access the secure application. Selectable option 803, when selected, may initiate the secure application to compare the received data to stored caller data, and use the comparison to determine whether to allow the caller access to the secure application.

Figure 9:
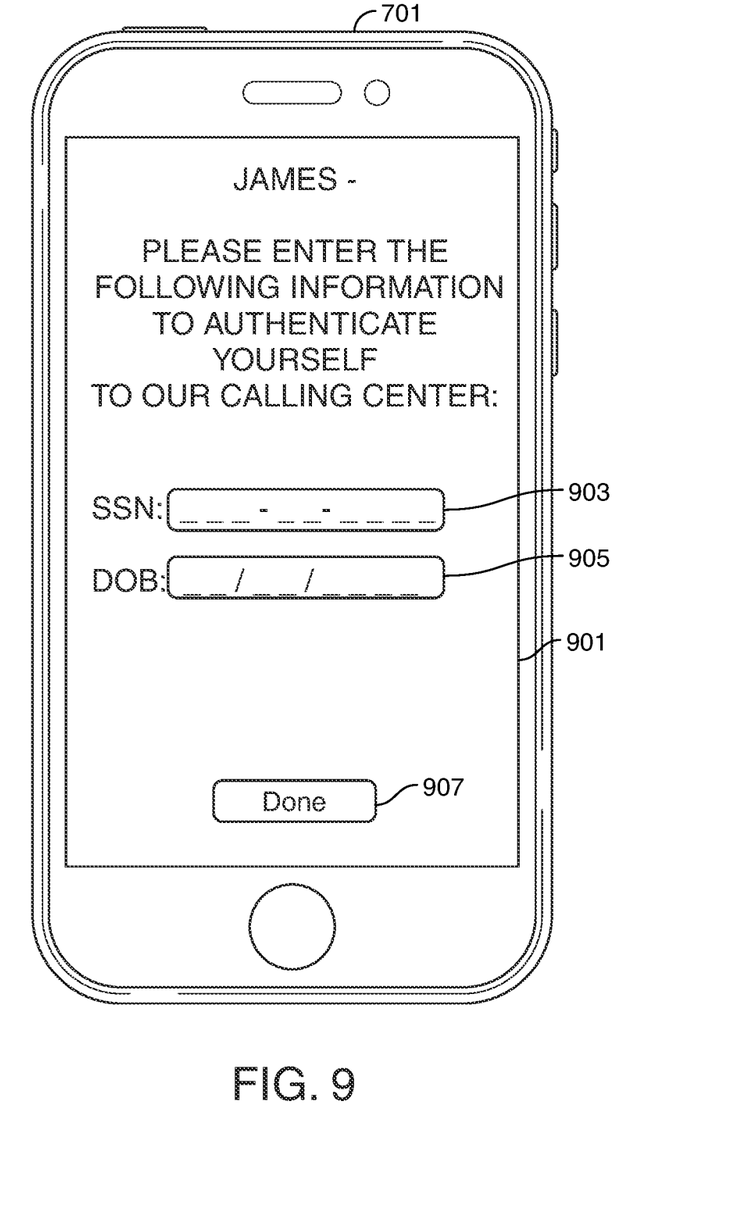
FIG. 9 shows an illustrative graphical user interface on an illustrative mobile device in accordance with the invention.

FIG. 9 shows an illustrative data entry validation interface 901. Illustrative data entry validation interface 901 may be a GUI. Data entry validation interface 901 may include first data input field 903 and second data input field 905. Selection of selectable icon 907 may trigger a transmission of data input into input fields 903 and 905 to the server as described herein.

Thus, systems and methods for securely authenticating an identity of a caller in an IVR system are provided. Persons skilled in the art will appreciate that the present invention can be practiced by other than the described embodiments, which are presented for purposes of illustration rather than of limitation.

What is claimed is:

1. A method for enhancing security of an authentication process of a caller initiating a call in an Interactive Voice Response ("IVR") system, the method comprising:
    using an IVR application run by the IVR system to identify a telephone number associated with the call and an identity of the caller;
    in response to the IVR application routing the call to a headset, initiating, using an agent computer in electronic communication with the headset, a search of a database to determine if a mobile phone associated with the caller has downloaded a secure application and if the secure application was accessed on the mobile phone during a pre-determined time period;
    feeding a machine-learning algorithm with selections received by the IVR system from the call, the feeding being initiated in response to a determination that the secure application is downloaded on the mobile phone and has been accessed during the pre-determined time period;
    receiving, from the machine-learning algorithm, first validation information and second validation information, the first validation information being associated with a first tag and the second validation information being associated with a second tag;
    displaying, on a graphical user interface ("GUI") of the agent computer, the first validation information and the second validation information, wherein the first validation information is displayed in a selected format, the selected format being triggered by the first tag, and the second validation information is displayed in a selectable format, the selectable format being triggered by the second tag;
    receiving, in the GUI, a selection of the second validation information and a command to trigger a push notification to the mobile phone;
    transmitting the push notification to the mobile phone, the push notification instructing the mobile phone to initiate an authentication process, wherein the authentication process is run, by the secure application, prior to authorizing access to the secure application;
    initiating, at the mobile phone, the authentication process in response to receipt of the push notification and not in response to a user input received in the mobile phone;
    after completion of the authentication process, displaying, on the mobile phone, a data entry validation interface including a first data input field for receiving the first validation information and a second data input field for receiving the second validation information;
    validating, at a server, the input data, the validating comprising comparing data input into the first data input field and the second data input field to information stored in a system of records database; and
    triggering a display, on the agent computer, of the input data in a partially concealed form in response to a validation, by the server, of the input data.

2. The method of claim 1 wherein:
    the GUI includes a plurality of selectable options, each selectable option, when selected, providing access to an electronic service; and
    prior to the validation, the selectable options are disabled.

3. The method of claim 2 further comprising displaying, on the GUI, third validation information, wherein:
the second validation information is associated with a first subset of the selectable options; and
the third validation information is associated with a second subset of the selectable options.

4. The method of claim 3 wherein the validation of the second validation information toggles the first subset of the selectable options to a selectable format.

5. The method of claim 3 wherein the validation of the second validation information toggles the first subset of the selectable options to a selectable format and the second subset of the selectable options remain disabled.

6. The method of claim 1 further comprising, in response to failing to validate the input data at the server, restricting a subset of applications running on the agent computer.

7. The method of claim 1 further comprising, in parallel with the initiating of the authentication process:
tracking, on the mobile phone, time lapsed after receipt of push notification; and
in response to the tracked time amounting to a time greater than a threshold time, pushing a data request from the mobile phone to the server for the data entry validation interface.

8. The method of claim 1 further comprising, after the validating,
generating, on the call, an automated message reporting the validation.

9. The method of claim 1 further comprising searching the database to identify the mobile phone, the mobile phone, in the database, being associated with the caller.

10. A method for enhancing security of an authentication process of a caller initiating a call in an Interactive Voice Response ("IVR") system, the method comprising:
using an IVR application run by the IVR system to identify a telephone number associated with the call and an identity of the caller;
in response to the IVR application routing the call to a headset, initiating, using an agent computer in electronic communication with the headset, a search of a database to determine if a mobile phone associated with the caller has downloaded a secure application and if the secure application was accessed on the mobile phone during a pre-determined time period;
displaying, on a graphical user interface ("GUI") of the agent computer, first validation information and second validation information in response to a determination that the secure application is downloaded on the mobile phone and has been accessed during the pre-determined time period;
receiving, in the GUI, a selection of the first validation information and a command to trigger a push notification to the mobile phone;
transmitting the push notification to the mobile phone, the push notification instructing the mobile phone to initiate an authentication process, wherein the authentication process is run, by the secure application, prior to authorizing access to the secure application;
initiating, at the mobile phone, the authentication process in response to receipt of the push notification and not in response to a user input received in the mobile phone;
after completion of the authentication process, displaying, on the mobile phone, a data entry validation interface including a data input field for receiving the first validation information;
validating, at a server, the input data, the validating comprising comparing data input into first data input field to information stored in a system of records database; and
triggering a display, on the agent computer, of the input data in a partially concealed form in response to a validation, by the server, of the input data.

11. The method of claim 10 wherein:
the GUI includes a plurality of selectable options, each selectable option, when selected, providing access to an electronic service; and
prior to the validation, the selectable options are disabled.

12. The method of claim 10 wherein, after the validating, the plurality of selectable options are toggled to a selectable format.

13. The method of claim 10 further comprising, in response to failing to validate the input data at the server, restricting a subset of applications running on the agent computer.

14. The method of claim 10 further comprising, in parallel with the initiating of the authentication process:
tracking, on the mobile phone, time lapsed after receipt of the push notification; and
in response to the tracked time amounting to a time greater than a threshold time, pushing a data request from the mobile phone to the server for the data entry validation interface.

15. The method of claim 10 further comprising displaying, on the GUI, a plurality of validation information, the plurality of validation information including the first validation information and the second validation information, each of the plurality of validation information being individually selectable, wherein, based at least in part on selections received by the IVR system from the call, one or more of the plurality of validation information is displayed in a selected format.

16. Apparatus for enhancing security of an authentication process of a caller initiating a call in an Interactive Voice Response ("IVR") system, the apparatus comprising:
an IVR system run by an IVR application for:
receiving a call in the IVR system;
identifying, based on tonal input received from the call, one or more selections selected by the caller;
identifying a telephone number associated with the call and an identity of the caller; and
based on predefined rules, routing the call to a headset; and
an agent computer in electronic communication with the headset, the agent computer for:
identifying the routing of the call to the headset, the routing triggering the agent computer to search a client database to determine if a mobile phone associated with the caller has downloaded a secure application and if the secure application was accessed on the mobile phone during a pre-determined time period;
feeding a machine-learning algorithm with selections received by the IVR system from the call, the feeding being initiated in response to a determination that the secure application is downloaded on the mobile phone and has been accessed during the pre-determined time period;
receiving, from the machine-learning algorithm, first validation and second validation information, the first validation information being associated with a first tag and the second validation information being associated with a second tag;

displaying, on a graphical user interface ("GUI") of the agent computer, the first validation information and the second validation information, wherein the first validation information is displayed in a selected format, the selected format being triggered by the first tag, and the second validation information is displayed in a selectable format, the selectable format being triggered by the second tag;

receiving, in the GUI, a selection of the second validation information and a command to trigger a push notification to the mobile phone; and transmitting the push notification to the mobile phone, the push notification instructing the mobile phone to initiate an authentication process, wherein the authentication process is run, by the secure application, prior to authorizing access to the secure application;

wherein:
the GUI includes a plurality of selectable options, each selectable option, when selected, providing access to an electronic service; and
prior to a validation of the first validation information, the selectable options are disabled.

17. The apparatus of claim 16 further comprising the mobile phone, the mobile phone being configured to:
initiate the authentication process in response to receipt of the push notification and not in response to a user input received in the mobile phone;
authenticate the caller based at least in part on the authentication process;
after completion of the authentication process, displaying, on the mobile phone, a data entry validation interface including a first data input field for receiving the first validation information and a second data input field for receiving the second validation information; and
transmit to a server data input into the data entry validation interface.

18. The apparatus of claim 17 further comprising a server for:
transmitting the push notification from the GUI to the mobile phone;
receiving, from the mobile phone, data input into the data entry validation interface;
validating the input data, the validating comprising comparing data input into the first data input field and the data input into the second data input field to information stored in a system of records database; and
transmitting a notification to the agent computer notifying the agent computer of a successful validation or an unsuccessful validation.

19. The apparatus of claim 18 wherein the agent computer:
in response to receipt, from the server, of a notification indicating unsuccessful validation, maintains the selectable options in a disabled state; and
in response to receipt, from the server, of a notification indicating successful validation, toggling the selectable options from the disabled state to a selectable state.

20. The apparatus of claim 19 wherein the agent computer:
in response to the receipt of the notification indicating successful validation, displays, on the GUI, the data input into the first data input field and data input into the second data input field in a partially concealed form.

* * * * *